United States Patent Office 2,745,356
Patented May 15, 1956

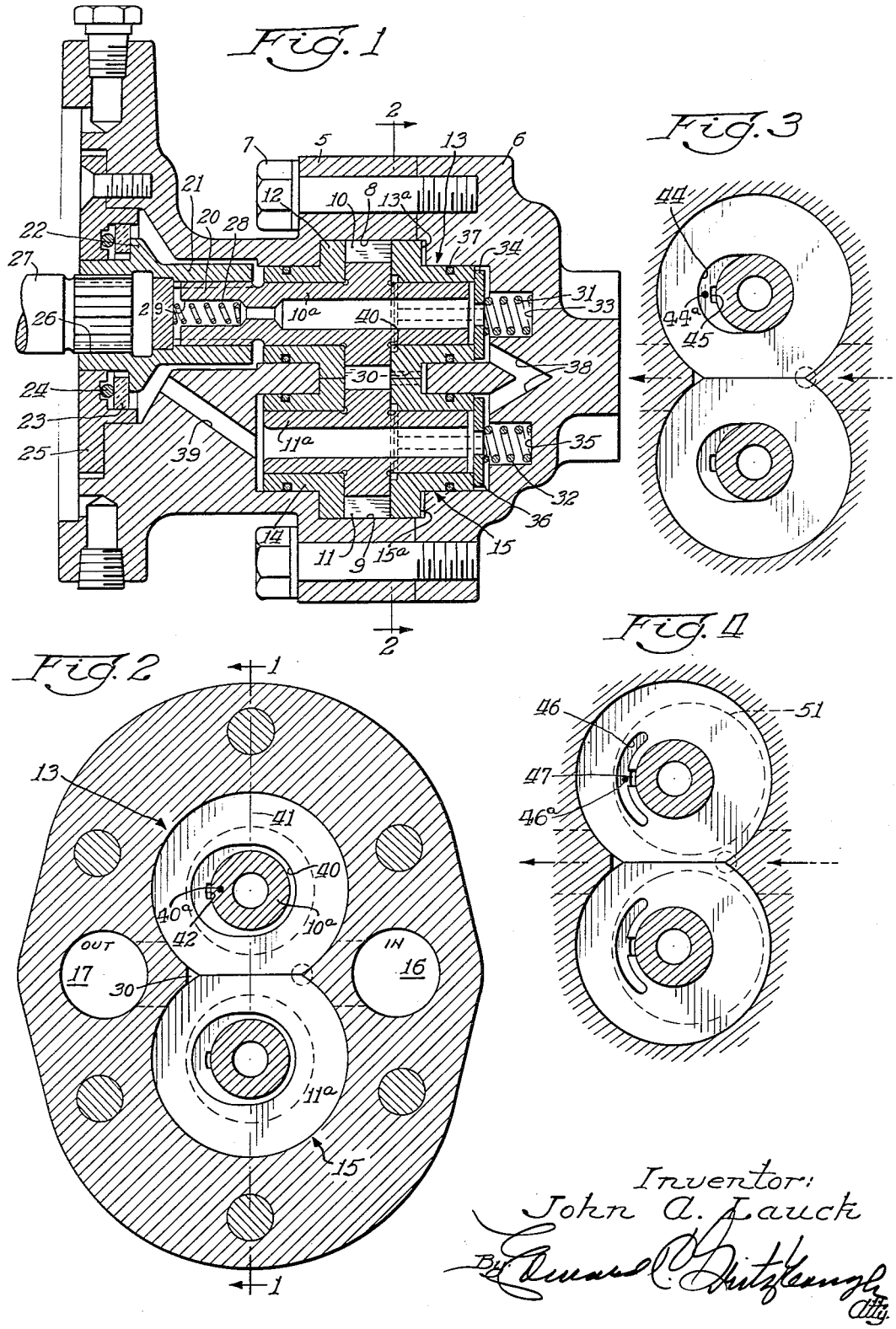

2,745,356

PRESSURE LOADED PUMP

John A. Lauck, Shaker Heights, Ohio, assignor to Borg-Warner Corporation, Chicago, Ill., a corporation of Illinois Application June 16, 1950, Serial No. 168,587

19 Claims. (Cl. 103—126)

This invention relates to a gear pump, and more particularly to a gear pump of the type employing pressure loaded bushings, such gear pumps sometimes being referred to as pressure loaded gear pumps.

In a pressure loaded gear pump of the type having one set of axially movable, pressure loadable bushings, a part of the output of discharge pressure of the pump is applied to the rear or motive surfaces of the axially adjustable bushings to urge these bushings into sealing engagement with their associated gears. As disclosed in U. S. Patent No. 2,420,622 to Roth et al., by carefully selecting the relative areas of the forward surfaces of the bushings and of the motive surfaces of the bushings, it is possible to control within very close limit the actual sealing pressure provided. In practice, this requires a somewhat higher effective pressure in the direction of seal than in the direction tending to open the seal.

In the usual form of pressure loaded pump, the pressure loading motive chamber to which output pressure is supplied will be substantially uniformly subjected to output pressure. That is to say, at any point on the motive surface at the rear of the bushing the same pressure will exist. This is not true of the forward or gear side surface engaging face of the bushing. This forward face is normally subjected to a distinct, pressure gradient extending from the inlet pressure in the area adjacent the pump inlet, which is the lowest pressure of the gradient, to the outlet pressure in the area adjacent the discharge side of the pump, at which area the pressure gradient is at its highest level. Accordingly, it will be evident that while the total pressure forces acting on the motive surfaces of the bushings of the pump may be made to equal the total pressure forces acting on the forward surfaces of the movable bushings, or to exceed these latter forces, the pressures acting on particular areas of the forward surface will not be uniform and that the portion of the bushing surfaces nearer the inlet will be subjected to a lesser pressure, tending to break the seal than the portion of the forward bushing surfaces nearer the outlet of the pump. This unbalanced condition tends to twist the bushing in the pump and results in uneven wear, thereby increasing the power required to turn the pump. Wear is, of course, concentrated on the inlet side of the pump.

It has been found that this unbalanced condition can to some extent be reduced by providing balancing grooves on the gear side face engaging surfaces of the pressure responsive bushings, these balancing grooves communicating at one end with the discharge side of the pump and extending coaxially of bushings toward the inlet port of the pump but terminating short thereof. The balancing grooves tend to render the pressure uniform over a larger area of the gear side face engaging surface than without the grooves. It will be evident, however, that it is not possible to extend the balancing grooves completely around the pump without providing a leakage path to the inlet side of the pump from the outlet side with consequent loss of pressure. Thus, while balancing grooves are helpful, they do not and cannot result in a perfectly balanced pump.

It has been further proposed to employ pressure loadable bushings having eccentrically disposed loading areas wherein the annular pressure area at the back of each bushing is offset with respect to the concentrically disposed annular area at the forward surface of the bushings so as to compensate, in effect, for the pressure gradient extending across the forward surface of the bushing. This method has met with considerable success and the present invention is directed to an alternative arrangement wherein the normally concentric annular recessed area at the forward or gear side face engaging surface of the bushings is offset with respect to the axis of the bushing to reduce the area of the forward surface adjacent the discharge side to compensate for the pressure gradient across this forward surface.

An object of the present invention is to provide a new and improved pressure loaded type, intermeshing gear pump.

A further object of the present invention is to provide a pressure loaded type, intermeshing gear pump wherein the area of the pressure loadable bushings adjacent the gear side faces is controlled as to extent and location to compensate for the pressure gradient across this area.

In accordance with one embodiment of this invention a pressure loaded type, intermeshing gear pump having one set of axially movable, pressure loadable bushings is provided wherein a portion of the annular forward surface of each of the pressure loaded bushings located radially inwardly of the roots of the gear teeth is recessed, and this recessed portion vented to a zone of low pressure. This recessed portion is offset with respect to the axis of the bushing so as to reduce the area of the forward bushing surface adjacent the discharge side thereof.

Other objects and advantages of the present invention will be apparent from the following detailed description thereof taken in conjunction with the drawings wherein:

Fig. 1 is an axial, sectional view of a pressure loadable type intermeshing gear pump having one set of axially movable, pressure loadable bushings constructed in accordance with this invention;

Fig. 2 is a transverse, sectional view taken substantially along the line 2—2 of Fig. 1 and showing to advantage the eccentric arrangement of the recesses in the forward surfaces of the pressure loadable bushings;

Fig. 3 is a view similar to Fig. 2 showing a modified form of recess; and

Fig. 4 is a view similar to Figs. 2 and 3, showing another modified form of recess, in combination with an offset pressure loading surface.

In order to simplify the description of this invention, it is shown and described herein in a pressure loaded gear type pump of the general type shown and described in U. S. Patent No. 2,420,622 to Roth et al. It will, however, be apparent that the present invention is equally applicable to other types of pressure loaded pumps.

Referring now to Fig. 1, a sectional pump housing is there illustrated comprising a main body portion 5 and a right closure or cover member 6. These two sections are securely bolted together as by threaded stud bolts 7 carried by the body portion 5 and threaded into the closure member 6. The two housing sections cooperate to define a pair of parallel, intersecting bores or pump gear chambers 8 and 9, receiving in complementary relationship intermeshing pumping gears 10 and 11 which are rotatably journalled therein. The chambers 8 and 9 are suitably formed to receive and support on either side of the pumping gears 10 and 11 bearing or bushing means 12, 13 and 14, 15, respectively. These bushings are radially flanged at their ends adjacent the gear side surfaces while their tubular body portions or barrels extend in opposite directions away from the pump gears, the body portions providing journal support for the pump gear shafts 10-a and 11-a. Low pressure liquid is introduced into the pump housing at inlet 16 and high pressure liquid is delivered from the outlet 17, the inlet and outlet passages communicating, respectively, with the inlet and discharge sides of the intermeshing pumping gears.

In the embodiment illustrated, the upper pumping gear 10 is the driving gear and, accordingly, the left end portion of gear journal 10-a is extended to the left to provide an externally splined coupling termination 20. The coupling termination 20 is received in the recessed right end of an internally splined coupling and packing member 21, having a radially extending flange 22 engaging a bearing ring 23, the opposite side of which ring presses against a flexible ring seal 24, retained against a suitably recessed portion of an annular retainer plate 25, mounted on and secured to the left side of housing section 5. Coupling member 21 terminates at its outer end in an internally splined connector recess 26 adapted to be engaged in driving relation with an auxiliary power shaft, such as shaft 27, of an aircraft engine or other driving mechanism. Compression spring 28 received in axially extending chamber 29 formed in the coupling termination 20 at the left end of gear shaft 10-a tends to urge the coupling member 21 to the left, thus eliminating initial end play and effecting an initial sealed engagement of flange 22, ring 23 and flexible seal 24. In the operation of this pump, the intermediate liquid pressure communicated to the seal, as explained in detail in the above-referred-to Patent No. 2,420,622, is effective to maintain operation of the seal assembly.

The flanged bushings 13 and 15 disposed, respectively, on the right sides of gears 10 and 11 are fitted into the bores 8 and 9 with sufficient clearance to permit slight axial movement of the bushings with respect to the bores. In the operation of this pump, discharge pressure generated by the intermeshing gears is communicated from the outlet or discharge side thereof to the annular pressure loading chambers defined by the rear flanged surfaces 13-a and 15-a of the bushings 13 and 15, the adjacent walls of the housing section 6 and the barrel portions of the bushings, through an axially extending passage 30 formed between the peripheries of the flanged portions of the bushings 13 and 15 on the discharge side of the pump at the point of convergence of the bushings. The passage 30 extends from the discharge side of the gears to the right, as viewed in Fig. 1, to the intercommunicating portions of the pressure loading chambers at their point of juncture. Initial loading pressure is provided by helically coiled springs 31 and 32, respectively, the spring 31 being associated with the upper bushing 13, and the spring 32 being associated with the lower bushing 15. More particularly, spring 31 has its right portion disposed in a cylindrical recess 33 formed in the cover member 6, and its left end bears against an annular disc 34 disposed in the right end of bore 8 and engaging at its left side the right end of bushing 13. A similar arrangement is provided for the spring 32, which is disposed in a recess 35 and bears against annular plate 36. Seal 37 located between the barrel portion of the bushings and the housing chamber wall substantially prevents escape of loading pressure rearwardly of the bushings. Pressure escaping past the seal rearwardly from the loading chambers is vented through two rearwardly extending converging passages 38 formed in the cover 6 either to inlet pressure or through a suitable relief valve (not shown) set to an intermediate pressure value to inlet or sump pressure. Pressure is communicated to the shaft assembly at the left end of the pump housing through the central passages in the hollow gear journals and a passage 39 formed in the pump housing.

Since the pump so far described is substantially identical with that shown in U. S. Patent No. 2,420,622, further detailed description of the general features and structure thereof is believed unnecessary.

In the operation of a gear pump of the type here shown, a pressure gradient exists across the faces of the bushings adjacent the gears, the pressure gradient extending from a pressure value equivalent to the inlet pressure of the pump at the inlet side thereof to the discharge pressure of the pump at the outlet side thereof. On the other hand, the pressure loading pressure applied to the motive loading surfaces 13-a and 15-a is substantially uniform over the full extent thereof. It will be apparent, therefore, that since the gear side face pressure acting against the loading pressure in the area adjacent the discharge side of the pump far exceeds the gear side face pressure acting against the loading pressure in the area adjacent the inlet side of the pump, the axially movable bushings 13 and 15 will tend to engage the gear side faces with a correspondingly greater force adjacent the inlet side. This unbalanced arrangement results in increased wear, and more particularly uneven wear, resulting in accelerated deterioration of the pump. The present invention is designed to overcome this unbalanced condition.

In the bushings of the type disclosed in U. S. Patent No. 2,420,622, there is provided a recess or groove in the forward or gear side face engaging surfaces of the bushings which is located radially inwardly of the roots of the gear teeth and is vented to low pressure. This groove is employed primarily to control the extent of the area of the gear side face engaging surface of the bushing exposed to the pressure gradient and to obtain an unbalanced pressure condition whereby the force exerted against the rear flanged surfaces of the bushings in response to pressure communicated to the rear or pressure loadable surface of the bushings will exceed the force tending to break the seal exerted against the forward surfaces of the bushings and the bushings will be urged up against the gear side faces in sealing relation. The groove is normally made concentric with respect to the axis of the bushing so that the center of area of the groove coincides with the axis of the bushing. The groove is vented either to low pressure or to a zone of intermediate pressure.

In accordance with the present invention, a groove or recess is provided in the gear side face engaging surfaces of each of the pressure loadable bushings and is located radially inwardly of the gear teeth. The recess, however, is not disposed concentrically with respect to the axis of the bushing but is located eccentrically, being offset in the direction of the discharge side of the pump so as to reduce the area of the annular surface adjacent the gear side faces near the discharge side of the pump. In this manner, the effective force tending to move the bushing away from the gear side faces is reduced adjacent the discharge side.

Thus, referring to Fig. 2, it will be seen that a groove 40 is formed in the gear side face engaging surface of each bushing and has a right portion, that is, a portion lying to the right of the vertical center line 41 of the pump as illustrated in this figure, which is generally concentric with respect to the axis of the bushing. However, the left portion of groove or recess 40 is extended radially outwardly so that the leftmost edge is closely adjacent the roots of the gear teeth. It will be obvious that the recess may not be extended radially so far as to place the recess in communication directly with the gear teeth. Axially extending groove 42 formed in the inner side of the bushing extends rearwardly, as viewed in Fig. 1, and is in communication with a zone of low pressure through the passages 38 and the central aperture in the retainer plates 34 and 36. The area of the forward surface of each bushing, that is, the annular surface adjacent the gear side face which is exposed to the pressure gradient, is therefore reduced, particularly the portion nearer the discharge of the pump since the recessed area is vented to low pressure. It has been found in practice that this expedient materially aids in balancing the loading forces exerted on the bushing. The center of area of the recess 40 is indicated by the point 40a and is offset transversely toward the outlet side of the pump from the bushing aperture axis.

In Fig. 3 a slightly modified form of recess is illustrated wherein a recess 44 is formed in the left side portion only of the gear side face engaging surface of each bushing, the recess extending radially outwardly from the inner periphery of the bushing. Axially extending groove 45 communicates this offset, somewhat crescent-shaped recessed area to a zone of low pressure, as through passages 38. It is not always feasible to employ a recess which completely surrounds the gear journal, that is, which defines a complete annulus as this may involve too great a reduction in the area of the forward surface of the bushing with a resultant undesirable increase in the effective sealing pressure in response to the loading force applied to the motive surfaces of the bushing. With this arrangement the center 44a of area of the recess is offset transversely toward the outlet side of the pump upon the bushing aperture axis. As with the arrangement shown in Fig. 2, the radially outer periphery of the recess 44 must be located slightly radially inwardly of the roots of the gear teeth so that a leakage path is not provided.

In Fig. 4 a further modified form of recess is shown comprising an arcuate groove 46 formed in the forward surface of each of the bushings adjacent the discharge side of the pump and having its inner wall located slightly radially outside of the inner periphery of the bushing but with its outer wall located slightly radially inwardly of the roots of the gear teeth. Axially extending groove 47 communicates this recessed area to a zone of low pressure. The center 46a of area of the recess 46 is offset toward the outlet side of the pump from the bushing aperture axis. As a result the effective pressure area of the forward surface of the bushing is reduced adjacent the outlet side of the pump.

Other recess configurations may, of course, be employed, the recesses illustrated being merely exemplary. It is necessary only that the offset recessed area be substantially isolated from the high pressure area by a barrier portion, that is to say that it be separated from the area adjacent the roots of the gear teeth by an unrecessed or barrier area and at the same time that the recessed area be vented to a zone of low pressure.

The recessed area in the gear side face engaging surface of each bushing disclosed in Figs. 1, 2, 3 and 4 may be employed in combination with an offset pressure loading or motive surface and by way of illustration only an offset loading surface has been indicated in Fig. 4 of the type disclosed in application Serial No. 130,904 filed December 3, 1949. As disclosed in that application, the periphery of the barrel portion, indicated at 51 in Fig. 4, of each of the pressure loaded bushings is offset with respect to the axis of the bushing so that the area of the annular, pressure loadable motive surface adjacent the discharge side of the pump is made to be substantially larger than the area of this motive surface adjacent the inlet side of the pump. By combining the offset recess in the forward surface with the offset pressure loading area at the back surface of the bushing, a substantially perfectly balanced pump may be provided.

It will be apparent, also, that inasmuch as the recess in the forward surface of the bushing is vented to inlet pressure, the area of this recess may be made responsive to inlet pressure, this being of particular importance where high inlet pressures are employed and the discharge pressure is made to exceed the inlet pressure by only a slight amount.

While this invention has been described particularly in conjunction with recessed grooves formed in the face of the bushings adjacent the gear side faces, it will be evident that it is also possible to form the grooves in the gear side faces radially inwardly of the gear teeth roots. This is ordinarily not as desirable because of the difficulty of forming the grooves or recesses in the gear side faces, the gears usually being made of a relatively harder material than the bushings.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawings.

What is claimed is:

1. A liquid pump comprising a housing having a pump chamber and an inlet leading to and an outlet leading from said pump chamber, means including a rotatable member received in said pump chamber for forcing liquid from said inlet out of said housing through said outlet, an end plate in said pump chamber having a back face normally spaced from the adjacent end wall of said pump chamber and having portions cooperable with said housing to provide a pressure chamber, said end plate also having a front face subject to pressures in said pump chamber and cooperable with the adjacent side faces of said rotatable member to provide a pumping seal therewith, one of said last two mentioned faces having a relief recess formed therein inwardly of its outer periphery to limit the sealing area between said side face and said front face, the center of area of said recess being offset with respect to the axis of said rotatable member, means establishing communication between said relief recess and said inlet and means establishing communication between said pressure chamber at the back of said end plate and said outlet, the relation of the area of said back face to said sealing area being such that the force acting upon said back face of said end plate always slightly exceeds the force acting upon said front face of said end plate whereby to maintain said pumping seal without excessive friction, wear or loss of volumetric efficiency.

2. A liquid pump in accordance with claim 1 wherein said recess is offset in the direction of said outlet whereby the area of said end plate front surface adjacent said outlet is reduced as compared with the area of said end plate front surface adjacent said inlet.

3. A pump device comprising: a housing containing a pair of adjoining substantially cylindrical chambers having radial end walls, said housing also having a high pressure port and a relatively low pressure port communicating with said chambers, a toothed gear member in each of said housing chambers, said gear members meshing at the juncture of said housing chambers; end plate means in said housing associated with said gear members on at least one side of said gear members, said end plate means including front faces cooperable with the adjacent side faces of the associated gear members, said front faces and said side faces constituting pairs of adjacent faces which provide a pumping seal between said gear members and said end plate means, said front faces being subject to the pressures in said housing chambers, said end plate means also having a back face normally spaced from the adjacent radial end wall of the associated housing chambers and having portions cooperable with said housing to provide pressure space at the back of said end plate means; means establishing communication between said high pressure port and pressure space at the back of said end plate means, whereby to subject the back of said end plate means to the pressure of the fluid in said high pressure port; a relief recess in one face of each pair of said pairs of adjacent pumping seal providing faces, said relief recesses being disposed inwardly of the roots of the teeth of said gear members, respectively, to limit the sealing area between said side faces of said gear members and said front faces of said end plate means; the center of area of each said relief recess being offset with respect to the axis of the associated gear member and located nearer the high pressure port than the low pressure port.

4. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, means defining an axially adjustable end plate received in said pump chamber and having a first surface area facing away from said rotatable member and normally spaced from the adjacent end wall of said pump chamber, said end plate having a second surface area subject to the pressures in said pump chamber and engageable with the adjacent side face of said rotatable member to provide a pumping seal therewith, passage defining means effective to direct pressure liquid generated by said rotatable member to said end plate defining means for urging the same in the direction of the adjacent rotatable member side face for maintaining a pumping seal therewith, the center of area of said second surface being offset transversely with respect to the center of area of said first surface.

5. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, means defining an axially adjustable end plate received in said pump chamber and having a first surface area facing away from the adjacent end wall of said pump chamber, said end plate having a second surface area subject to the pressures in said pump chamber and engageable with the adjacent side face of said rotatable member to provide a pumping seal therewith, passage defining means effective to direct pressure liquid generated by said rotatable member to the first surface of said end plate defining means for urging the second surface of said end plate defining means in the direction of the adjacent rotatable member side face for maintaining a pumping seal therewith, the center of area of said second surface area being offset eccentrically with respect to the center of area of said first surface area so that the greater portion of said second surface area is disposed adjacent the inlet side of said pump.

6. A fluid pump comprising a housing having a pump chamber formed therein, said housing having an inlet leading to and an outlet leading from said pump chamber, means including a rotatable member received in said pump chamber effective to force fluid from said inlet out of said housing through said outlet, means defining an axially adjustable end plate received in said pump chamber and having a first surface area facing away from said rotatable member and normally spaced from the adjacent end wall of said pump chamber, said end plate having a second surface area subject to the pressures in said pump chamber and engageable with the adjacent side face of said rotatable member to provide a pumping seal therewith, passage defining means effective to direct pressure liquid generated by said rotatable member to said first surface of said end plate defining means for urging the second surface of said end plate defining means in the direction of the adjacent rotatable member side face for maintaining a pumping seal therewith, the center of area of said second surface area being offset with respect to the axis of rotation of said rotatable member so that the greater portion of said second surface area is disposed adjacent the inlet side of said pump.

7. A pressure loadable bushing comprising: means defining a first surface area adapted to engage a rotatable element in sealing relation, the center of area of said first surface area being offset eccentrically with respect to the axis of said bushing, and means defining a second surface area to which loading pressure may be applied to move said first surface area into sealing relation, the center of area of said second surface area being oppositely eccentrically offset with respect to said first surface area, and means including a recess in said first surface area for accomplishing said eccentric offset center of area of said first surface area.

8. A fluid pump of the type including a housing having an inlet and an outlet port formed therein, a rotatable pumping member journalled in said housing for transferring fluid from said inlet to said outlet port, movable end plate means having a sealing surface adapted to engage said pumping member in sealing relation, and a motive surface on said end plate adapted in response to application of pressure thereto to urge said end plate sealing surface toward said rotatable member to establish said sealing relation, said sealing surface being generally annular and having a substantially circular outer periphery concentrically disposed with respect to the axis of rotation of the pumping member, the inner periphery of said sealing surface being eccentrically disposed with respect to the axis of rotation of said pumping member and having its center offset toward said discharge port, said motive surface being generally annular and having a substantially circular outer periphery concentrically disposed with respect to the axis of rotation of the pumping member.

9. In a gear pump, a pump housing, a pumping gear in said housing, a pressure loadable bushing having a first surface area adapted to engage the gear side face in sealing relation and a second surface area at the opposite side of said bushing from said first surface area to which pressure generated by said pump may be applied to move said first surface area into sealing relation with said gear, and a recessed area adapted to be vented to a zone of low pressure, said recessed area being formed in said first surface area and located radially inwardly of the roots of the gear teeth, the center of area of said recessed area being offset transversely with respect to the center of area of said first surface.

10. In a gear pump, a pump housing, a pumping gear in said housing, a pressure loadable bushing having a first surface area adapted to engage the gear side face in sealing relation and a second surface area at the opposite side of said bushing from said first surface area to which pressure generated by said pump may be applied to move said first surface area into sealing relation with said gear, and a recessed area adapted to be vented to a zone of low pressure, said recessed area being formed in said first surface area and located radially inwardly of the roots of the gear teeth, the center of area of said recessed area being offset with respect to the center of area of said first surface nearer the discharge side of said pump than the inlet side of said pump.

11. In a gear pump, a pump housing, a pumping gear in said housing, a pressure loadable bushing having a first surface area adapted to engage the gear side face in sealing relation and a second surface area at the opposite side of said bushing from said first surface area to which pressure generated by said pump may be applied to move said first surface area into sealing relation with said gear, and a recessed area adapted to be vented to a zone of low pressure, said recessed area being formed in said first surface area and located radially inwardly of the roots of the gear teeth, the center of area of said recessed area being offset with respect to the center of said first surface area, said recessed area having a portion thereof disposed substantially concentrically with respect to the axis of rotation of said gear and lying adjacent the inlet side of said pump while a second portion of said recessed area is offset toward the discharge side of said pump.

12. In a gear pump, a pump housing, a pumping gear in said housing, a pressure loadable bushing having a first surface area adapted to engage the gear side face in sealing relation and a second surface area at the opposite side of said bushing from said first surface area to which pressure generated by said pump may be applied to move said first surface area into sealing relation with said gear, and a recessed area vented to a zone of low pressure, said recessed area being formed in said first surface area and located radially inwardly of the roots of the gear teeth, the center of area of said recessed area being offset with respect to the center of said first surface area, said recessed area comprising a crescent-shaped recess disposed adjacent the high pressure side of said pump.

13. A pressure loadable bushing having a sealing surface adapted to be exposed to discharge pressure and a recessed area in said surface adapted to be vented to a zone of lower than discharge pressure, said recessed area being asymmetrically disposed with respect to said surface and having a crescent-shaped configuration.

14. A pressure loadable bushing for an intermeshing gear type pump having a forward surface adapted to engage an adjacent gear side face in sealing relation, said forward surface having a recess formed therein adapted to be vented to a zone of low pressure, the radially outer edge of said recess being located radially inwardly of the roots of the pump gear teeth and eccentrically disposed with respect to said pumping gear side face.

15. In a pressure loadable pump, a pumping gear, shaft means for rotating said gear, a pressure loadable bushing into which said shaft extends and which is arranged to engage at its forward surface the adjacent side surface of said pumping gear in sealing relation, means establishing communication with the pressure generated in said pump with the side of said pressure loadable bushing opposite its forward surface whereby said bushing is urged toward the adjacent side surface of said pumping gear by said generated pressure, groove defining means in one of said surfaces, the center of area of said groove defining means being eccentrically located with respect to said surfaces, and means placing said groove means in communication with a zone of lower than pump discharge pressure.

16. In a pressure loadable pump, a pumping gear, shaft means for rotating said gear, a pressure loadable bushing into which said shaft extends and which is arranged to engage at its forward surface the adjacent side surface of said pumping gear in sealing relation, means establishing communication with the pressure generated in said pump with the side of said pressure loadable bushing opposite its forward surface whereby said bushing is urged toward the adjacent side surface of said pumping gear by said generated pressure, groove defining means in one of said surfaces, the center of area of said groove means being offset with respect to the center of area of the grooved surface, and means placing said groove means in communication with a zone of lower than pump discharge pressure, the radially outer edge of said groove defining means being located radially inwardly of the roots of said pumping gear teeth.

17. In a pressure loadable pump, a pumping gear, shaft means for rotating said gear, a pressure loadable bushing into which said shaft extends and which is arranged to engage at its forward surface the adjacent side surface of said pumping gear in sealing relation, means establishing communication with the pressure generated in said pump with the side of said pressure loadable bushing opposite its forward surface whereby said bushing is urged toward the adjacent side surface of said pumping gear by said generated pressure, groove defining means in one of said surfaces having its center of area offset with respect to the center of area of said one of said surfaces, and means placing said groove means in communication with a zone of lower than pump discharge pressure, the radially inner edge of said groove means being spaced radially outwardly of the inner edge of said bushing surface.

18. In a pressure loadable pump, a pumping gear, shaft means for rotating said gear, a pressure loadable bushing into which said shaft extends and which is arranged to engage at its forward surface the adjacent side surface of said pumping gear in sealing relation, means establishing communication with the pressure generated in said pump with the side of said pressure loadable bushing opposite its forward surface whereby said bushing is urged toward the adjacent side surface of said pumping gear by said generated pressure, groove defining means in one of said surfaces having its center of area offset with respect to the center of area of said one of said surfaces, and means placing said groove means in communication with a zone of lower than pump discharge pressure, the radially outer edge of said groove means being located radially inwardly of the roots of said pumping gear teeth, the radially inner edge of said groove means being spaced radially outwardly of the inner edge of said bushing surface.

19. A pressure loadable bushing comprising means defining a flange portion and a barrel portion, a first surface area on said flanged portion adapted to engage a rotatable element in sealing relation, the center of area of said first surface area being offset eccentrically with respect to the axis of said bushing, a second surface area on said flange opposedly disposed with respect to said first surface area and defined by said barrel portion and further providing a pressure responsive surface, and means including a recess in said first surface area for accomplishing said eccentric offset center of area of said first surface area.

References Cited in the file of this patent

UNITED STATES PATENTS

| Number | Name | Date |
|---|---|---|
| 465,907 | Whipple | Dec. 29, 1891 |
| 1,470,030 | Rolaff | Oct. 9, 1923 |
| 1,539,728 | Ensign | May 26, 1925 |
| 1,737,942 | Pagel | Dec. 3, 1929 |
| 1,972,632 | Patton | Sept. 4, 1934 |
| 2,044,873 | Beust | June 23, 1936 |
| 2,266,820 | Smith | Dec. 23, 1941 |
| 2,312,655 | Lauck | Mar. 2, 1943 |
| 2,312,891 | Ferris | Mar. 2, 1943 |
| 2,405,061 | Shaw | July 30, 1946 |
| 2,420,622 | Roth et al. | May 13, 1947 |
| 2,527,941 | Lauck et al. | Oct. 31, 1950 |